Aug. 8, 1944.  L. G. WEBSTER ET AL  2,355,126
GROMMET
Filed Aug. 18, 1942
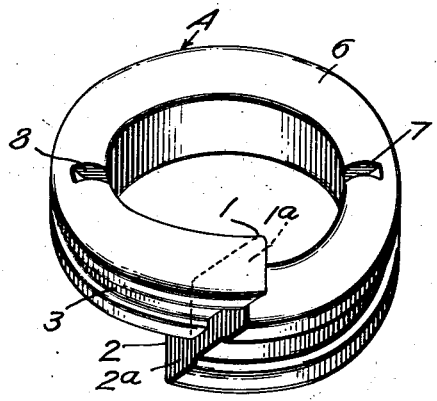
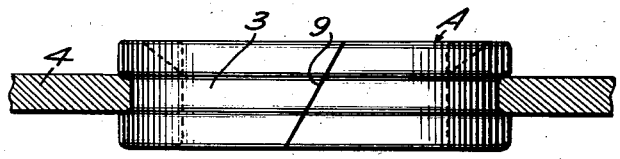
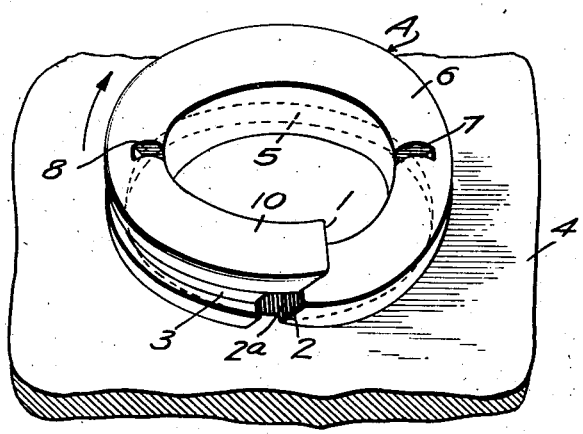
INVENTORS
LEWIS G. WEBSTER
FRED J. REES
BY
ATTORNEYS Patented Aug. 8, 1944

2,355,126

UNITED STATES PATENT OFFICE 2,355,126

GROMMET

Lewis G. Webster and Fred J. Rees, Dayton, Ohio

Application August 18, 1942, Serial No. 455,238

3 Claims. (Cl. 16—2)

(Granted under the act of March 3, 1883, as amended April 30, 1928; 370 O. G. 757)

The invention described herein may be manufactured and used by or for Government for governmental purposes, without the payment to us of any royalty thereon.

This invention relates to an improved construction of grommet or sleeve for insertion in an opening in a wall, bulkhead, or the like, for the protection of wires, cables, tubes, etc., from wear due to frictional contact with the relatively thin edge of the opening.

A principal object of the invention is to provide a device of the character described which may be formed out of comparatively stiff, though somewhat resilient, shape-retaining material such as a plastic or a spring metal, thereby releasing strategic materials such as rubber, or the like, from which conventional design grommets are made, for other necessary uses.

Another object of the invention is to provide a device of the character referred to which is constructed so that its insertion in a hole for its intended use is made easier without requiring any special tools for such emplacement.

Another object of the invention is to provide a device of the character referred to whose construction is such as to enable it to be self-locking in position in a hole in which it may be inserted for its intended purpose so that the device is thereby maintained more securely in its desired position.

The embodiment of the invention shown comprises a grommet in the form of a sleeve having a spiral peripheral groove adapted to receive therein between the sides thereof material surrounding an opening in a wall or the like whereby to maintain the sleeve in position in such opening against axial displacement therefrom when such material is so received in said groove. Preferably, as in the construction illustrated, the grommet is split or severed radially on one side of its central axis, its ends at the point of cleavage being offset axially so as to provide a sleeve-like member of spiral form having a peripheral groove, following the spiral convolution of said member, the groove being designed to receive therein the material of the wall around the hole into which the grommet is to be inserted. The adjacent extremities of the spiral provided by the severance of the sleeve are preferably provided with planar meeting faces, the plane of which is inclined at an angle to the axis of the sleeve member or grommet and the same is preferably radially contracted initially so that, upon application of pressure to the adjacent ends of the grommet in opposite directions axially thereof, to bring the peripheral groove into circumferential continuity, the sleeve will be diametrically expanded by engagement of the inclined planar meeting faces of the spiral extremities of the sleeve. The material of which the grommet is composed, though comparatively stiff and shape retaining, is of sufficient resiliency to permit the diametrical expansion above mentioned.

The construction is such that the grommet may be screwed into position lining an opening in a wall or the like by causing the material around such opening to engage in one portion of the peripheral groove and then rotating the sleeve, said sleeve being yieldable to permit the ends of the groove to be brought into circumferential alignment upon such rotation.

Other objects, advantages, and features of novelty will be apparent as the description of the invention proceeds in conjunction with the drawing in which:

Figure 1 is a perspective view of a device constructed in accordance with the invention.

Figure 2 is a view showing the device inserted in a hole in a wall in position for its intended use, the device being viewed in edge elevation and the wall being shown in section.

Figure 3 is a perspective view of the device of the invention, illustrating the method of insertion of the same for its intended use in a hole in a wall.

Now, describing the invention in detail, the grommet comprises a sleeve-like member, generally designated by the letter A, which is radially split at one side of the longitudinal axis thereof, as indicated at 9 in Figure 2, to provide adjacent ends 1 and 2, which in the formation of the sleeve A are offset axially so that the sleeve has a substantially spiral configuration, the body of the sleeve comprising one full convolution of a spiral. The radial severance of the sleeve A at one side of the longitudinal axis thereof provides the spiral or convolute extremities 1 and 2 with the planar meeting faces 1a and 2a, the plane of which is inclined at an angle to the longitudinal axis of the member A. This member A is provided with a peripheral groove 3 which follows the convolution of the spiral and said groove is designed to receive therein the material of a wall 4 adjacent the hole 5 within which the grommet comprising the sleeve member A is designed to be inserted for lining the hole 5.

The sleeve member A is preferably composed of a relatively stiff shape-retaining material which nevertheless has sufficient resiliency to permit the sleeve member A to be slightly diametrically expanded and to yield slightly under axial pressure to permit the ends 1 and 2 to move axially relative to each other.

The angle of incline of the planar meeting faces 1a and 2a is such that, when pressure is applied to the spiral extremities 1 and 2 so as to move the same in opposite directions axially of the sleeve A to bring the ends of the groove 3 into circumferential alignment, said sleeve will be radially expanded by engagement of said inclined meeting faces 1a and 2a during such relative axial movement of the spiral extremities of the sleeve.

Many of the plastics, such as those made from cellulose acetate, provide suitable materials out of which the grommet comprising the sleeve A may be made, or spring steel or other spring metal may compose the body of the sleeve. One face 6 of the sleeve A may be provided with slots 7 and 8 for engagement by a suitable bit or other tool for a purpose hereinafter mentioned. Both faces of the sleeve A may be provided with such slots if desired.

Figure 1 illustrates the grommet comprising the sleeve A in its normal condition prior to emplacement in the hole 5 of the wall 4. It is to be particularly noted that the spiral extremities or ends 1 and 2 of the spiral convolution, into which the sleeve A is cast, are axially offset relative to one another, and the whole body of the sleeve is somewhat radially contracted in its normal condition prior to emplacement in the hole 5 of the wall 4 for its intended use, so that the whole body of the sleeve A initially assumes a spiral configuration with the peripheral groove 3 extending around the body of the sleeve A in a spiral path like a screw thread. While the spiral extremities 1 and 2 are axially offset respecting one another in the initial condition of the sleeve A, nevertheless, the planar meeting faces 1a and 2a provided at these extremities are in flat engagement for a portion of their respective surfaces.

In the use of the grommet of the invention, the device is inserted in the hole 5 of the wall 4 by starting one extremity of the groove 3, such as that defined at the face 2a, into the hole 5 in the manner indicated in Figure 3 and then rotating the sleeve A about its longitudinal axis in the direction of the arrow indicated in Figure 3 so as to screw the grommet into the hole 5, the material of the wall 4 entering the peripheral groove 3 which acts in the manner of a screw thread. A suitable bit or other tool may be inserted in the slots 7 and 8 for facilitating this rotation of the sleeve A. After the grommet is started into the hole 5, as above indicated, rotation may be continued until the material of the wall 4 surrounding the hole 5 has entered the entire length of the groove 3, at which time said groove will be in circumferential continuity as indicated in Figure 2.

During the rotation of the sleeve A to screw the same into position in the hole 5, it will be apparent that the material of the wall 4 surrounding the hole will act in the groove 3 to apply axial pressure in opposite directions to the spiral extremities 1 and 2, causing the same to move relatively to one another by engagement of the inclined planar meeting faces 1a and 2a so as to cause the sleeve A to be diametrically expanded until the sleeve A is fully positioned in the hole 5 at which time the extremities of the groove 3 will be in circumferential alignment or continuity.

Once the grommet is started into the hole 5, by engagement of the material of the wall 4 surrounding said hole in the groove 3 by partial rotation of the sleeve A in the manner indicated in Figure 3, it is not necessary that rotation of the sleeve A be continued until said sleeve is fully positioned in the hole 5, as indicated in Figure 2, in order to get the sleeve into that position. At a certain point after the starting rotation has been accomplished and a part of the material of the wall 4 surrounding the hole 5 has entered the groove 3, the application of external axial pressure to the area indicated by the numeral 10 on the face 6 near the spiral extremity 1 will cause the sleeve A to be sprung into fully seated condition with the material of the wall entering the entire extent of the groove 3 as indicated in Figure 2. This action is due to the inherent resiliency of the sleeve member A, the fact that the same is initially slightly radially contracted, and to the action of the inclined planar meeting faces 1a and 2a at the spiral extremities of the sleeve A in diametrically expanding the sleeve A when axial pressure is applied in opposite directions to the spiral extremities 1 and 2 of said sleeve.

It will be apparent that, when the grommet is fully positioned in the hole 5, with the material of the wall 4 surrounding said hole fully entering the groove 3 throughout the extent thereof, the inherent spring action or resiliency of the sleeve A will cause the grommet to be tightly maintained in position due to the natural tendency of the spiral extremities 1 and 2 to tend to resume or spring back to their initial axially offset condition respecting one another as indicated in Figure 1.

Modifications of the structure within the scope of the invention will readily suggest themselves to those skilled in the art and we therefore do not desire to be limited to the specific structure of the preferred embodiment of the invention shown and described. For example, it is contemplated that, within the scope of the invention, the grommet need not necessarily be resilient or be radially split and, in such event, the spiral peripheral groove will, nevertheless, enable the grommet to be screwed into the opening and securely maintained in such position by the binding action of said spiral groove with respect to the material surrounding the opening entering said groove. However, the preferred, resilient split-sleeve embodiment of the invention, particularly described herein, is considered to have very material advantages not otherwise obtained, as will be apparent from the foregoing.

Having thus described our invention, what we claim as new and desire to secure by Letters Patent of the United States is:

1. A grommet of the class described comprising a sleeve-like member of spiral form having a peripheral groove following the spiral convolution of said member, the latter having its spiral extremities normally arranged in an axially offset abutting relation, said extremities of said member having planar meeting faces, the plane of which is inclined at an angle to the axis of the sleeve, whereby upon application of pressure to said extremities of said sleeve in opposite directions axially thereof to bring the peripheral groove into circumferential continuity, said sleeve will be diametrically expanded by engagement of the inclined planar meeting faces of the spiral extremities of the sleeve.

2. A grommet of the class described comprising a sleeve-like member of spiral form having a peripheral groove and having its spiral extremities arranged in an axially offset adjacent relation, said member being composed of comparatively stiff shape-retaining material having sufficient resiliency to permit said member to be radially expanded, the spiral extremities of said member having planar meeting faces the plane of which is inclined at an angle to the axis of said sleeve whereby, upon application of pressure to said extremities of said sleeve in opposite directions axially thereof to bring the peripheral groove into circumferential continuity, the sleeve will be diametrically expanded by engagement of the inclined planar meeting faces of said extremities of the sleeve, said sleeve being normally slightly radially contracted in its initial condition prior to the application of such axial pressure.

3. A grommet of the class described comprising a sleeve radially severed at one side of the longitudinal axis thereof and composed of comparatively stiff shape-retaining material having sufficient resiliency to permit such sleeve to be radially expanded, said sleeve having a peripheral groove, the portions of the sleeve adjacent the point of severance being axially movable relative to one another to enable the ends of the groove at the point of severance to be moved into and out of circumferential alignment, the extremities of said sleeve portions adjacent the point of severance having inclined planar meeting faces, the plane of said faces being inclined at an angle to the axis of said sleeve, whereby upon relative axial movement of said sleeve portions toward one another, said sleeve will be diametrically expanded by engagement of said meeting faces, said sleeve being normally slightly radially contracted with said sleeve portions normally arranged in axially offset abutting relation in its initial condition prior to axial movement of said sleeve portions as aforesaid.

LEWIS G. WEBSTER.
FRED J. REES.